United States Patent [19]

Koppijn

[11] 3,976,803

[45] Aug. 24, 1976

[54] FOAMED FORMED CONFECTIONS

[76] Inventor: Jan Herman Koppijn, 29, Single, B-2230, Schilde, Antwerp, Belgium

[22] Filed: Nov. 5, 1975

[21] Appl. No.: 629,474

Related U.S. Application Data

[63] Continuation-in-part of Ser. No. 439,946, Feb. 5, 1974, abandoned.

[30] Foreign Application Priority Data

Apr. 3, 1973 Belgium .............................. 258323

[52] U.S. Cl. ................................. 426/572; 426/660
[51] Int. Cl.² ............................................ A23G 3/00
[58] Field of Search ............ 426/568, 571, 572, 660

[56] References Cited
UNITED STATES PATENTS

| | | | |
|---|---|---|---|
| 3,350,209 | 10/1967 | Rodgers | 426/572 |
| 3,532,513 | 10/1970 | Katz | 426/572 |
| 3,586,513 | 6/1971 | Horn et al. | 426/572 |
| 3,592,663 | 7/1971 | Brunner | 426/572 |
| 3,684,528 | 8/1972 | Batey | 426/572 |
| 3,726,691 | 4/1973 | Seiden | 426/572 |

*Primary Examiner*—Jeanette M. Hunter
*Attorney, Agent, or Firm*—Kaufman & Kramer

[57] ABSTRACT

Foamed formed confections prepared by using a mixture of two or more types of glucose syrup, particularly equal quantities of an enzymatic glucose syrup and a maltose syrup.

6 Claims, No Drawings

FOAMED FORMED CONFECTIONS

CROSS-REFERENCE TO RELATED APPLICATION

This application is a continuation-in-part of copending application Ser. No. 439,946 filed February 5, 1974 now abandoned.

BACKGROUND OF THE INVENTION

My invention relates to foamed formed confections such as, for example, meringue sweets, nougat, marshmallows, dutch chocolate kisses (white center chocolate kisses) baby sweets (easy melting fruit flavored, aerated sugar candy) and the like.

SUMMARY OF THE INVENTION

In the conventional recipe for these articles, 25 weight percent dextrose is considered to be the maximum. As a matter of fact, the texture of the article gets gritty, too hard or too hygroscopic when this maximum is exceeded. If, however, two or more kinds of glucose syrup are used as proposed according to my invention, this trouble can be overcome, all desired ratios of saccharose and dextrose can be used and saccharose may even be completely replaced by dextrose.

Thus, in accordance with the present invention a foamed formed confection is provided comprising (a) about 50 weight percent of a mixture comprising from 3 to 97 weight percent of an enzymatic glucose syrup and from 97 to 3 weight percent of a maltose syrup and (b) about 50 weight percent of dextrose or a mixture of dextrose and saccharose.

To further illustrate the present invention, a syrup can be used which can be obtained by boiling a mixture ranging from 20 to 30 weight percent of an enzymatic dextrose syrup with a dextrose unit value ranging from 56 to 63 and more, 20 to 30 weight percent of a maltose syrup (with a dextrose content of at most 5 weight percent) and 40 to 60 weight percent dextrose. Maltose syrup is mostly an enzymatically prepared dextrose syrup containing at most 5 weight percent of dextrose and a maltose content ranging from 35 to 40 weight percent. If need be, part of the dextrose is replaced with saccharose, though this is not essential. Stabilizer ranging from 3 to 20 weight percent, for instance, Sorbitol, may also be added. If desired vegetable and/or animal whipping agents also can be used.

The following advantages are inherent in the application of my invention (in arbitrary order of succession):

1. It is generally known that dextrose or glucose or D-glucose is the vital sugar, that is to say that this monosaccharide is directly absorbed by the blood and due to its combustion, liberates the necessary energy in the muscular tissue.

2. It has been found that dextrose aids fattening to a lesser extent; this, contrary to what happens when conventional saccharose is used which leads to successive formation of fructose and conversion into body fats.

3. Due to the greater quantity of bubbles at a given volume, one can obtain considerably lower specific gravities, while conserving at least equal consistency and keeping qualities, and even an improvement thereof.

The following arbitrary examples are illustrative:

a. Specific gravity 0.09 for the interior of the Dutch chocolate "kisses", against which normally a specific gravity of less than 0.16 is advised (more than 40 percent lower).

b. Specific gravity of 0.22 for a non-chocolate covered marshmallow for which normally a specific gravity of 0.30 is maintained, this, in connection with the desired minimal keeping qualities.

4. The keeping qualities of the articles are improved since they are less hygroscopic.

5. Since inversion is virtually impossible (if the traditional component saccharose is not added) technological permanence and reproductiveness are ensured, while intuitive skill and the problematic "fingertip feeling" are no longer needed in the manufacturing process. Moreover, waste may be used again in an uninterrupted way.

6. While in the conventional recipe, the specific gravities are limited by the recipe itself, the weights in the scope of the present invention are only limited by considerations of taste, consistency and keeping qualities.

7. Use of stabilizers, as, for example, agar agar, pectin and the like are not necessary, nor use of additional animal and vegetable whipping agents.

8. Substitution of dextrose has particular aspects in relation to avoiding or delaying tooth decay, although from the academic point of view, this theory is still open to controversy.

9. Owing to the lower specific gravities, the calorific value per consumption unit has decreased, while the volume per unit retains the same ratio.

10. According to the physical properties, the products based on the present invention are more suitable for export to and consumption in tropical countries.

11. Due to the physiological properties, combined with the lower cost price per unit, the products based on the present invention, are very suitable for consumption in countries with a low standard of living.

12. The crustation, important for the keeping qualities, is obtained by using the present invention allowing for continuous mass production, packing within ten minutes after frothing and forming included, without any use of common drying rooms during 24 to 48 hours.

13. Cost price advantages resulting from the lower prices in most countries of glucose and dextrose as compared with saccharose sugar, and advantages from the lower specific gravities according to the present invention.

14. Dextrose has a negative solution heat. This results in that on dissolving dextrose in the cavity of the mouth, calories are removed from the tongue and the palate which consequently gives rise to a delicious taste of the products of the invention.

One may therefore in certain cases refrain from adding flavoring agents which is of great advantage in countries having very strict sanitary regulations with respect to flavoring agents. Moreover, this implies that one can define in particular cases the products to be completely natural and sound (Produit Sain et Naturel).

15. Due to its high osmotic pressure, the dextrose conditions the tongue papillae to discern the flavoring substances.

16. Products based on the present invention do not get gritty, hard or hygroscopic as has always been assumed. Use of preservatives is superfluous as well.

The advantages as defined in points 1 to 16 are more or less inversely proportional to the quantities of saccharose employed; they stay however, unabridged if sacchrose as a component is completely excluded.

An example of the method according to the invention is described hereinafter:

A mixture of 150 kg dextrose together with 75 kg of a maltose syrup, 75 kg of an enzymatic glucose syrup and 25 kg sorbitol, if any, is boiled up to a temperature of 120°C with the required quantity of water (about 20 liters).

Furthermore, a jelly is prepared by dissolving 21 kg gelatin in 30 liters of warm water:

The jelly is added to the syrup when the latter is cooled down to a temperature ranging from 90° to 70°C. After having added flavoring and coloring substances, if any, the mass is foamed to the desired extent, either by whipping in a vertical mixer, or by beating under pressure, or in a continuous foaming machine. After the foaming process, the mass is poured on a cooling table, injected into starch, rubber or plastic molds or extruded via nozzles, finished at will and the foamed formed confection is finally packed.

As a matter of course, the present invention is not limited to the aforementioned form or method, but these can be modified both qualitatively and quantitatively within the scope of the invention.

Thus, it is possible to replace the above mentioned amount of maltose syrup and of an enzymatic glucose syrup with 5 kg of a maltose syrup and 145 kg of an enzymatic glucose syrup or to use 145 kg of a maltose syrup and 5 kg of an enzymatic glucose syrup, without losing one of the above mentioned advantages. The same holds for intermediate amounts for the enzymatic glucose syrup and the maltose syrup.

Preferred amounts of the enzymatic glucose syrup amount to 50 – 100 kg and 100 – 50 kg of a maltose syrup.

What is claimed is:

1. A foamed formed confection comprising (a) about 50% by weight of a mixture comprising from 3 to 97 weight % of an enzymatic glucose syrup and from 97 to 3 weight % of an maltose syrup and (b) about 50% by weight of dextrose or a mixture of dextrose and saccharose.

2. A confection according to claim 1 which additionally contains from about 3 to about 20 weight % of sorbitol, based on the weight of said confection.

3. A confection according to claim 1 in which (b) consists essentially of dextrose.

4. A foamed formed confection comprising from 20 to 30 weight % of an enzymatic glucose syrup, from 30 to 20 weight % of a maltose syrup and from 40 to 60 weight % of dextrose.

5. A confection according to claim 4 in which the maltose syrup contains from about 35 to about 40% of maltose and at most 5% of dextrose.

6. A confection according to claim 4 in which the enzymatic glucose syrup has a dextrose unit value of from 56 to 63.

* * * * *